United States Patent
Lee et al.

(10) Patent No.: US 8,432,457 B2
(45) Date of Patent: Apr. 30, 2013

(54) METHOD FOR COMPRESSING VIDEOS AND PLAYING COMPOSITE IMAGES OF THE VIDEOS

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 373 days.

(21) Appl. No.: 12/756,971

(22) Filed: Apr. 8, 2010

(65) Prior Publication Data
US 2011/0193979 A1   Aug. 11, 2011

(30) Foreign Application Priority Data
Feb. 5, 2010 (CN) .......................... 2010 1 0301293

(51) Int. Cl.
*H04N 5/225* (2006.01)

(52) U.S. Cl.
USPC ................................................... 348/218.1

(58) Field of Classification Search .................. None
See application file for complete search history.

(56) References Cited

U.S. PATENT DOCUMENTS

| | | | | |
|---|---|---|---|---|
| 7,636,482 | B1 * | 12/2009 | Kita et al. | 382/238 |
| 7,764,310 | B2 * | 7/2010 | Nitta | 348/220.1 |
| 8,068,693 | B2 * | 11/2011 | Sorek et al. | 382/284 |
| 2002/0003573 | A1 * | 1/2002 | Yamaguchi et al. | 348/218 |

* cited by examiner

*Primary Examiner* — Luong T Nguyen
(74) *Attorney, Agent, or Firm* — Altis Law Group, Inc.

(57) ABSTRACT

A method for compressing videos obtains videos from a storage device, selects a main frame from the videos at each time layer and each angle, and further selects a new main frame after each time interval and angle interval. Then, the method obtains frames between two adjacent main frames, and stores different pixels between each of the obtained frames and a previous main frame of the two adjacent main frames, so as to obtain composite images of the videos.

9 Claims, 5 Drawing Sheets

METHOD FOR COMPRESSING VIDEOS AND PLAYING COMPOSITE IMAGES OF THE VIDEOS

BACKGROUND

1. Technical Field

Embodiments of the present disclosure relate to a video processing technology, and particularly to a method for compressing videos and playing composite images of the videos.

2. Description of Related Art

Generally, videos are captured by a camera from a single angle in many video-equipped security systems, then the captured videos are compressed at the single angle. When the compressed videos are decoded by multi-media playing software, a single display is provided at a time. As a result, some areas to be monitored can be neglected, with some events occurring not captured for display. Therefore, an efficient method for compressing videos and playing composite images of the videos is desired.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
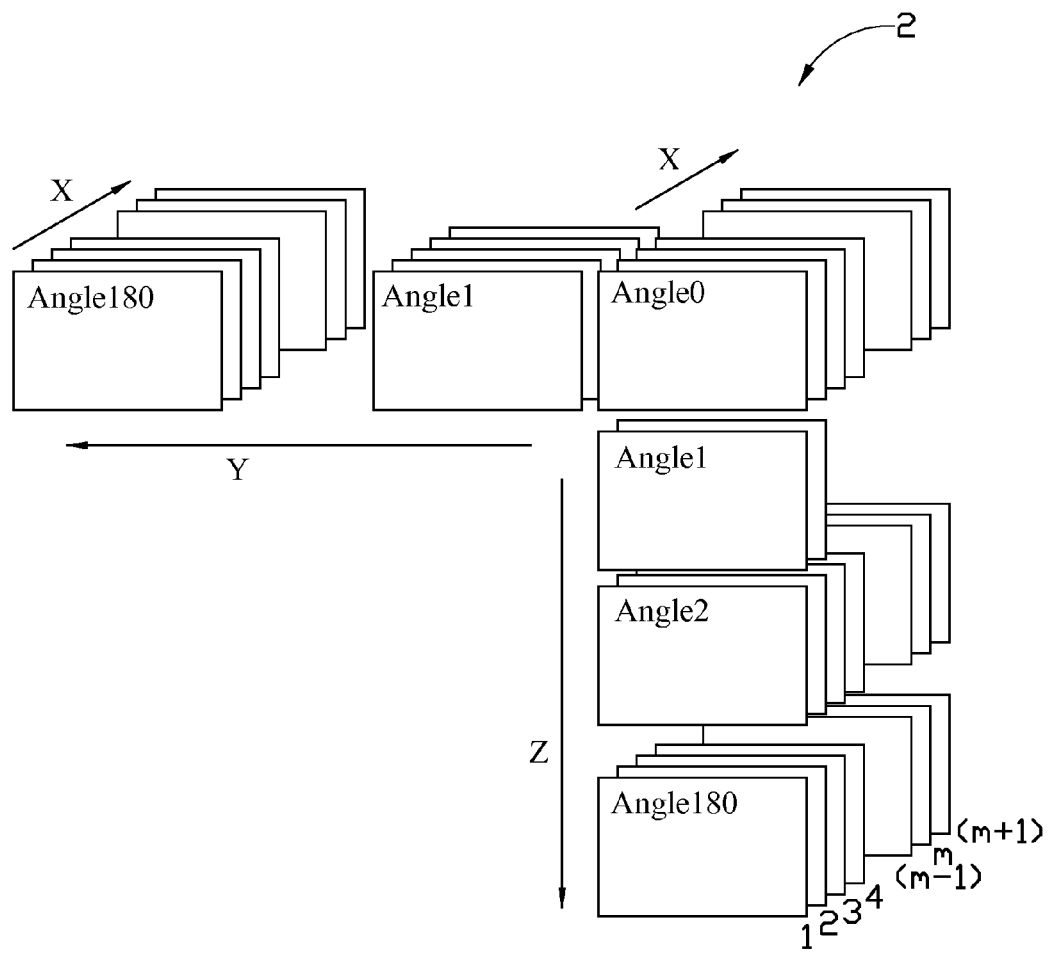
FIG. 1 is a schematic diagram of one embodiment of videos captured from different angles.

FIG. 1 is a schematic diagram of one embodiment of videos 2 captured from different angles. As shown in FIG. 1, "X" represents a time axis, and "Y" and "Z" represent space axes. There are a plurality of time layers on the time axis, and a plurality of angles at different directions on the space axes. In one embodiment, the videos 2 include a plurality of time layers (referring to FIG. 2) and images of a plurality of angles (referring to FIG. 3).

In one embodiment, the videos 2 are captured by a plurality of lenses of a camera array at different angles. The plurality of lenses of the camera array may be arranged circularly at a constant distance or arranged circularly at varying distances. In other embodiment, the plurality of lens of the camera array may be arranged in a circular curve at a constant distance or arranged in a circular curve at varying distances.

Figure 4:
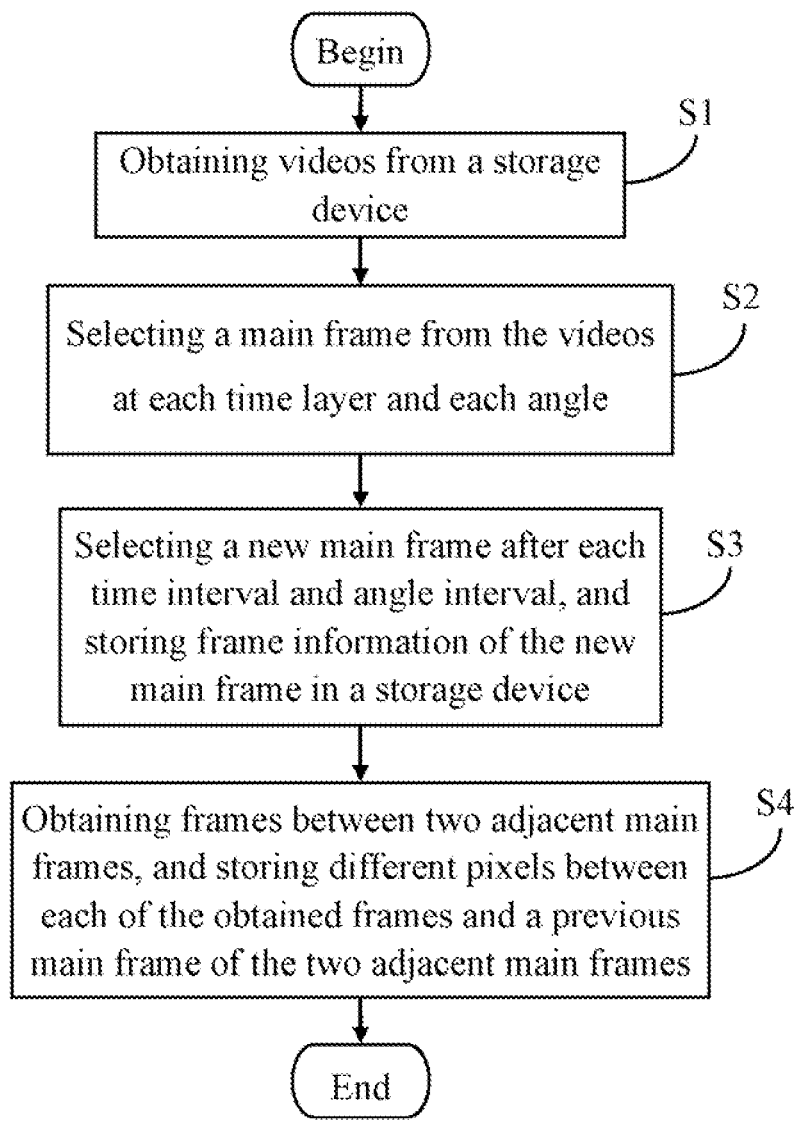
FIG. 4 is a flowchart of one embodiment of a method for compressing videos.

FIG. 4 is a flowchart of one embodiment of a method for compressing videos.

In block S1, videos 2 are obtained from a storage device. The videos 2 may include a plurality of time layers and angles.

In block S2, a main frame is selected from the videos 2 at each time layer and each angle, and frame information of the main frame is stored in the storage device. For example, a first frame is selected as the main frame from the videos 2 at each angle (e.g., frame 1 in FIG. 2), and a central frame is selected as the main frame from the videos 2 at each time layer (e.g., frame Angle0 in FIG. 3). In one embodiment, the frame information includes a gray value of each pixel in the frame and the coordinates of each pixel.

In block S3, a new main frame is selected after each of a plurality of time intervals and each of a plurality of angle intervals, and frame information of the new main frames are stored in the storage device. Each time interval and each angle interval may be a fixed time interval and a fixed angle interval (e.g., predetermined values), or a non-fixed time interval and a non-fixed angle interval (e.g., optional values). In one embodiment, a new main frame is selected beginning from the first frame of the videos 2 at each angle after each time interval and angle interval, and a new main frame is selected beginning from the central frame of the videos 2 at each time layer after each time interval and angle interval.

In block S4, frames between two adjacent main frames are obtained from the videos at each time layer and each angle, and different pixels between each of the obtained frames and a previous main frame of the two adjacent main frames are stored in the storage device, to obtain composite images of the videos. In one embodiment, the two adjacent main frames include two adjacent main frames of the videos at each angle and two adjacent main frames of the videos at each time layer.

Figure 2:
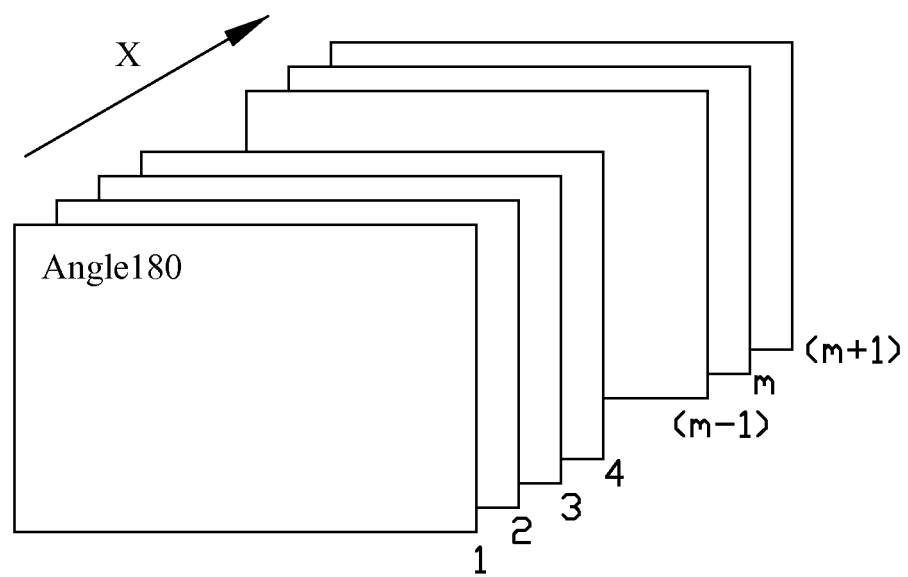
FIG. 2 is a schematic diagram of one embodiment of the video in one angle.
Figure 3:
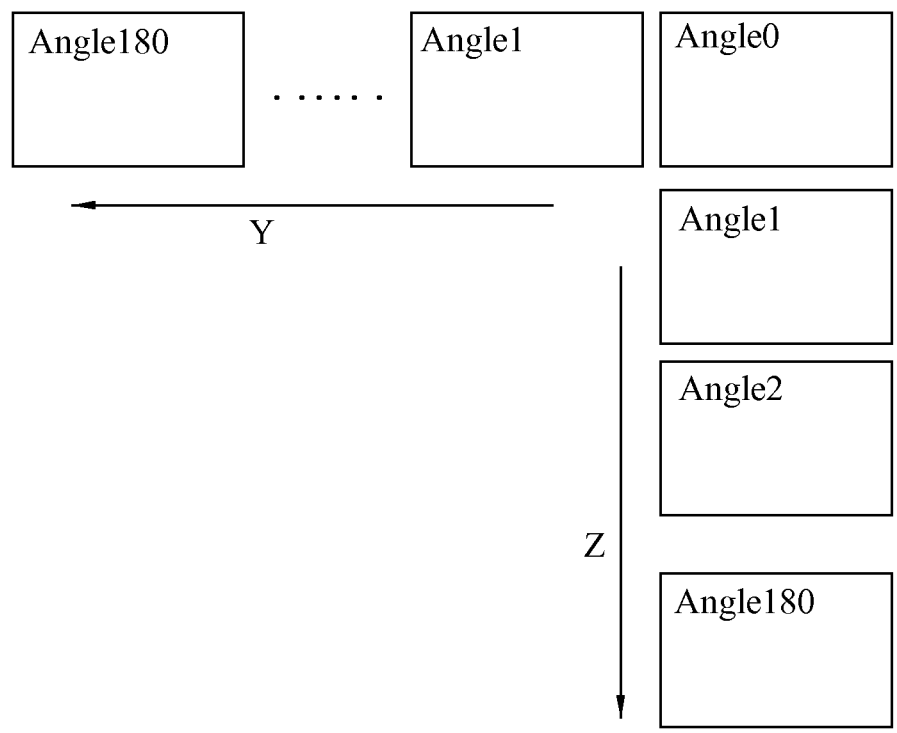
FIG. 3 is a schematic diagram of one embodiment of the video in one time layer.

For example, a new main frame is selected after each of three frames from the first frame of the video at Angle180, such as frame 1, frame 4, frame 7, . . . as shown in FIG. 2. Frame information of these main frames (e.g., frame 1, frame 4, and frame 7, etc.) is stored in the storage device. Referring to frame 2 and frame 3 (i.e., the frames between frame 1 and frame 4), different pixels between frame 1 and frame 2, frame 1 and frame 3 are stored in the storage device. Referring to frame 5 and frame 6 (i.e., the frames between frame 4 and frame 7), different pixels between frame 4 and frame 5, frame 4 and frame 6 are stored in the storage device.

Figure 5:
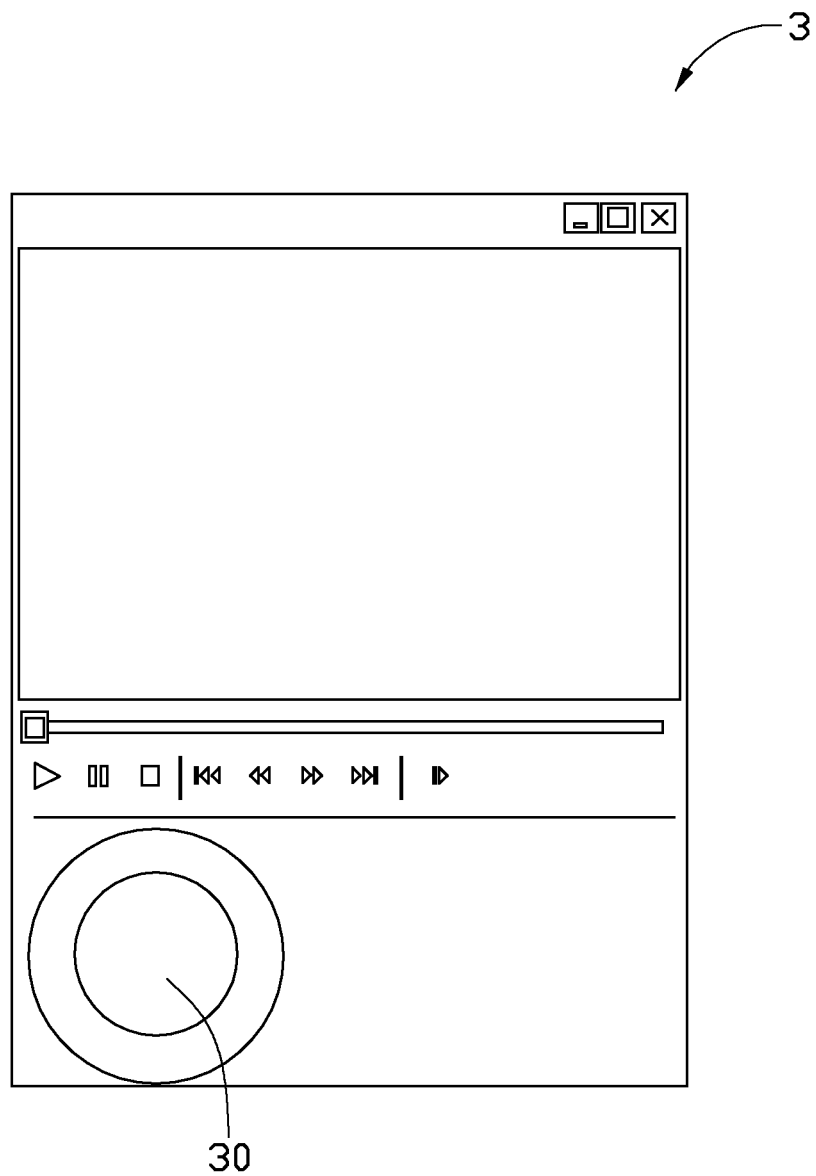
FIG. 5 is a schematic diagram of one embodiment of an interface of multi-media playing software.

FIG. 5 is a schematic diagram of one embodiment of an interface of multi-media playing software 3.

There is an angle adjusting button 30 on the interface of the multi-media playing software 3. The angle adjusting button 30 can be adjusted (e.g., dragged and rotated) to obtain different angles. In one embodiment, the multi-media playing software 3 may be used to play the composite images of the videos obtained by the above mentioned method (referring to FIG. 4). Detailed descriptions are provided as follows.

Firstly, the angle adjusting button 30 receives a user operation, and obtains a selected angle corresponding to a position of the angle adjusting button 30. In one embodiment, the user operation may include an operation of dragging the angle adjusting button 30 leftward or rightward, an operation of dragging the angle adjusting button 30 upward or downward, and an operation of rotating the angle adjusting button in a clockwise direction or a counterclockwise direction.

Secondly, the multi-media playing software 3 stops playing videos of a current angle, and obtains videos of the selected angle from the storage device.

Thirdly, the multi-media playing software 3 plays the videos of the selected angle.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented video compressing method, comprising:
   obtaining videos from a storage device, wherein the videos comprise a plurality of time layers and angles;
   selecting a main frame from the videos at each time layer and each angle, and storing frame information of the main frame in the storage device;
   selecting a new main frame after each of a plurality of time intervals and each of a plurality of angle intervals, and storing frame information of the new main frame in the storage device; and
   obtaining frames between two adjacent main frames from the videos at each time layer and each angle, and storing different pixels between each of the obtained frames and a previous main frame of the two adjacent main frames, so as to obtain composite images of the videos.

2. The method according to claim 1, wherein the videos are captured by a plurality of lenses of a camera array at different angles.

3. The method according to claim 2, wherein the plurality of lenses of the camera array are arranged circularly at a constant distance or arranged circularly at varying distances.

4. The method according to claim 2, wherein the plurality of lenses of the camera array are arranged in a circular curve at a constant distance or arranged in a circular curve at varying distances.

5. The method according to claim 1, wherein the frame information of the main frame comprises a gray value of each pixel in a frame and coordinates of each pixel.

6. The method according to claim 1, wherein the step of selecting the main frame from the videos at each time layer and each angle comprises:
   selecting a first frame as the main frame from the videos at each angle; and
   selecting a central frame as the main frame from the videos at each time layer.

7. The method according to claim 6, wherein the step of selecting the new main frame after each of the plurality of time intervals and each of the plurality of angle intervals comprises:
   selecting the new main frame beginning from the first frame of the videos at each angle after each time interval and angle interval; and
   selecting the new main frame beginning from the central frame of the videos at each time layer after the each time interval and angle interval.

8. The method according to claim 7, wherein each time interval and each angle interval are a fixed time interval and a fixed angle interval, or a non-fixed time interval and a non-fixed angle interval.

9. The method according to claim 7, wherein the two adjacent main frames comprise two adjacent main frames of the videos at each angle and two adjacent main frames of the videos at each time layer.

* * * * *